Patented May 19, 1936

2,041,193

UNITED STATES PATENT OFFICE 2,041,193

ESTERIFICATION OF OLEFINES

William McCandliss Lee, Philadelphia, Pa., assignor to The Sharples Solvents Corporation, Philadelphia, Pa., a corporation of Delaware No Drawing. Application November 18, 1930, Serial No. 496,556

26 Claims. (Cl. 260—106)

This invention relates to a process for the production of esters formed by the union of a hydrocarbon radical with an acyl radical of either the aliphatic or the aromatic series.

Esters formed by the union of an organic acid with an aliphatic hydrocarbon of the type which may be regarded structurally as a derivative of (though not necessarily prepared from) secondary or tertiary alcohols, have especially useful technical properties, and commercially are desirable as paint solvents and for other purposes in which esters are used that correspond to substances which may be regarded structurally as derivatives of primary alcohols. No method has heretofore been known, so far as I am aware, for the direct, economical and controlled production of these highly desirable secondary and tertiary esters. For example, the best prior method for the preparation of tertiary esters has been to react a mixture of equivalent parts of a tertiary alcohol and acyl chloride such as acetyl chloride and an organic base such as pyridine or dimethyl aniline. Such reagents, however, are expensive and the process is ill adapted for commercial use. It is a purpose of the present invention to make secondary and tertiary esters using raw materials not heretofore regarded as available for the preparation of such esters, and employing in connection therewith a novel chemical process involving the transformation of primary and secondary unsaturated hydrocarbons into secondary and tertiary products, and especially into esters which may be regarded structurally as derivatives of secondary and tertiary alcohols.

In this specification, use will be made of the expressions "primary", "secondary" and "tertiary" alcohol, "normal" and "iso" olefin, "primary", "secondary" and "tertiary" ester, and the like. These and similar expressions will be used with reference to the following generic illustrations.

Referring to the alcohols the following will be understood:

Primary alcohol_____ $RCH_2OH$
Secondary alcohol_____ $(R)_2CHOH$
Tertiary alcohol _____ $(R)_3COH$ where R represents any alkyl group such for example as $CH_3CH_2CH_2CH_2$, either straight or branched chain. These alcohols are characterized respectively by the primary alkyl radical $RCH_2$, the secondary alkyl radical $R_2CH$, and the tertiary alkyl radical $R_3C$, adjacent the hydroxyl radical.

Referring to unsaturated aliphatic hydrocarbons of the olefinic type, the following will be understood:

Normal olefin_____ $RCH=CHR$ or $RCH=CH_2$
Iso olefin_____ $(R)_2C=CHR$ or $(R)_2C=CH_2$ these hydrocarbons being characterized respectively by the primary grouping $RCH$; and the secondary grouping $R_2C$.

The esters of primary, secondary and tertiary alcohols are referred to herein as primary, secondary, and tertiary esters and the following will be understood:

Primary ester_____ $RCH_2OOCR$
Secondary ester_____ $(R)_2CHOOCR$
Tertiary ester_____ $(R)_3COOCR$ In the above illustrations the esters are characterized respectively by the primary alkyl radical $RCH_2$, the secondary alkyl radical $(R)_2CH$, and the tertiary alkyl radical $R_3C$ adjacent the oxygen atom of the radical $OOCR$. The radical $OOCR$ is generic to monobasic aliphatic acids either straight or branch chain with the exception of formic acid and contains the generic acyl radical $OCR$. The radical $OOCR$ in the case of formic acid would of course, be written $OOCH$. While a monobasic aliphatic acid is used by way of illustration, this invention also includes the production of esters from all aliphatic and aromatic acids which are soluble to a substantial extent in the reacting substances hereinafter to be described.

A feature of this invention resides in the production of secondary and tertiary esters from normal and iso unsaturated aliphatic hydrocarbons of the olefin series having four or more carbon atoms. Another feature resides in the production of tertiary alkyl esters from a mixture of olefins, comprising both normal and iso olefins, thus furnishing a means for the direct production of tertiary esters from a mixture of raw materials in which no effective separation has been made of the normal and iso olefins. A further feature of the invention resides in the production of either secondary or tertiary esters from mixtures of normal and/or iso olefins with other substances such as normal saturated hydrocarbons, and the like, which, I have found, in no way affect the completeness of the reaction nor the satisfactory nature of the separation of the desired esters from the contaminating products mixed with the raw material. A still further feature of this invention lies in the successful production of tertiary esters from iso olefin without excessively polymerizing the iso olefin.

For the purpose of affording a clear understanding of the invention, but without imposing limitation thereon, it will be described with particular reference to the preparation of secondary and tertiary esters from a mixture of normal and iso amylenes containing contaminating saturated hydrocarbons such as pentane. Such a mixture is produced by a process, now in commercial operation, for the production of alcohol in which saturated hydrocarbons of the paraffin series having from four to six carbon atoms, (i. e., butane and the higher gasoline hydrocarbons), are chlorinated under the action of heat alone at temperatures in the neighborhood of 500° F. The chlorinated hydrocarbons are separated from the remaining products and are hydrolyzed by treatment with caustic soda in the presence of water and an ester of a substantially water-insoluble fatty acid, with the resulting production of alcohol and unsaturated olefinic substances corresponding in carbon atom content to the original hydrocarbon used. If such a process be employed using pentane as a raw material, there will be produced at the completion of the process amyl alcohol and, as a by-product or residue, a mixture of products containing 42% to 73% of one or more normal amylenes, having for example the formula $CH_3CH_2CH=CHCH_3$, 20% to 40% of one or more iso isomers of amylene, discussed below, and 7% to 18% of pentane.

I am unable to declare with certainty the true composition of the isomer or isomers of amylene which are present in this mixture. Our investigations lead us to believe that this substance, or mixture of substances, consists of one or more iso amylenes having one or more of the following formulae:

$$(CH_3)_2C=CHCH_3$$

$$(C_2H_5)(CH_3)C=CH_2$$

For the purposes of the present invention it is immaterial which of these iso amylenes is involved in the reaction, or whether both of them enter into it.

It is also possible to obtain the olefin mixture above described from the chlorinated products above mentioned occurring at an early stage in the alcohol-making process above referred to. Thus the chlorinated products may be passed in vapor phase through a heated tube and, by suitable temperature control, HCl is caused to split off producing unsaturated olefinic hydrocarbons having a carbon atom content identical with that of the saturated hydrocarbon originally chlorinated. This modification of such process converts it in combination with the process of the present invention into a process for the manufacture of secondary and tertiary esters from usual gasoline hydrocarbons, and avoids the production of alcohols which would otherwise be the ultimate desired end product of such process, if employed without the present modification. In carrying out the step of elimination of HCl as suggested above, it is desirable however that the material supplied to the heating tube in the vapor phase consist so far as practicably possible of chlorides of a homogeneous nature, that is, solely chlorides of butane or solely chlorides of pentane, or the like, and it is also preferable to avoid employing chlorides which will be degraded (i. e., the chain broken as in cracking) in the process. When the foregoing process is employed, it will be found that, after the elimination of HCl by the method described, there will remain a mixture of normal and iso unsaturated olefinic compounds. In this case, as in the one previously described, it may be that the iso olefinic compound is present in the form of one or more isomers, which, if pentane be the gasoline hydrocarbon originally chlorinated will probably have one or more of the structural formulas suggested above.

It will be understood that the process which is the subject of the present invention will operate successfully upon any mixture of normal and iso olefins, however produced; e. g., by decomposition of higher iso-alcohols in making esters.

In accordance with the present invention, and describing it first in connection with the formation of tertiary amyl acetate, iso amylene which may also contain in admixture normal amylene and saturated hydrocarbons such as pentane, is mixed with a slight excess of the esterifying acid in concentrated form. In this example, glacial acetic acid is employed. A high concentration is employed in order to promote esterification without the collateral production of alcohols. The mixture produces a solution without apparent reaction. When the mixture has been thoroughly worked together, a substance which acts as a catalyst is added. I have found that certain of the so-called heavy acids such as sulphuric acid or phosphoric acid will give satisfactory results. Catalysts which may be used are not, however, limited to the heavy acids, as certain other substances such as zinc chloride also give satisfactory results. The catalytic material added should preferably be added carefully and only in such quantities and in such concentration as will be necessary to promote the esterification. Where the catalyst used is sulphuric acid, for example, an excess of the acid or a considerable local concentration thereof tends to effect undesirable polymerization of the iso amylene to form undesirable addition products such as decylene. The catalyst and esterifying acid are therefore preferably mixed in advance and this mixture is added to the amylene or the amylene is added to the mixture. I have found that approximately 5% of a catalyst, e. g., sulphuric acid gives satisfactory results, or this amount may be somewhat increased as hereinafter described to the betterment of the yield if, upon experiment, the nature of the amylene mixture appears to require it.

In the above-described operation, I have found that where liquid olefins are mixed with glacial acetic acid, a clear solution results. The presence of a small amount of sulphuric acid, however, produces a separate layer comprising sulphuric acid mixed with some of the acetic acid. I have found the addition of acetic anhydride increases the mutual solubility of the layers which are formed and promotes the formation of tertiary amyl acetate. The employment of the anhydride in the manufacture of tertiary esters is therefore advantageous according to this invention.

Upon addition of the catalyst, it will be found that chemical reaction proceeds with the evolution of heat. The reaction occurs only between the iso amylene and the acetic acid with the formation of tertiary ester as the normal amylene remains substantially unaffected. The reaction appears to be rapid and, if a suitable amount of agitation be employed to bring about complete association of the reacting substances, the reaction will be completed within three or four minutes. I have found that leaving these substances in contact with one another for many hours will not materially increase the yield above that obtained within three or four minutes.

I have found that undesirable polymerization of iso olefins is decreased by maintaining the temperature of the above described reaction low, by maintaining the concentration of the catalyst, e. g., sulphuric acid, low and by reducing the time during which the reacting substances are maintained in contact with the acid. The formation of polymerization products is particularly promoted by heat in the presence of acid.

Where iso amylene is treated with acetic acid at a temperature of about 30° C. in the presence of about 5% of sulphuric acid, polymerization, while not completely avoided, occurs very slowly and only a small amount of polymerization products will be formed even though the reacting substances are maintained in contact with the sulphuric acid for a considerable period of time. Where the percentage of sulphuric acid in the reaction mass is increased under similar temperature conditions, the rate of formation of polymerization products gradually increases. In such case, the amount of polymerization products that is formed can be lessened by reducing as much as possible the length of time that the reaction mass is in contact with the sulphuric acid. Thus as high as 60% sulphuric acid may be used at a temperature of 30° C. without forming excessive quantities of polymerization products if the acid is maintained in contact with the reaction mass only long enough for the reaction to take place and to permit handling of the materials. In general and especially where relatively higher concentrations of acid are used, the reaction period should be made as short as is consistent with good yields. Where more than about 60% of sulphuric acid is used, the rate of polymerization materially affects yields and a concentration of sulphuric acid such as 75% to 80% causes polymerization to occur with great rapidity at a temperature of about 30° C.

At corresponding temperatures, I have found that the rate of polymerization of iso olefin is somewhat less with phosphoric acid than with sulphuric acid, e. g., about 75% of phosphoric acid corresponds to 60% sulphuric acid in this respect. With phosphoric acid as a catalyst, the esterification reaction is somewhat slower than with sulphuric acid though it is substantially as complete. Where zinc chloride is used, the rate of polymerization is even slower than it is with phosphoric acid. Moreover, the esterification reaction is slower with zinc chloride than with sulphuric acid and the selective esterification of only iso olefin is not quite as complete as where sulphuric acid is used.

Those quantities of sulphuric acid, or other heavy acid or other catalyst which avoid undesirably rapid polymerization of secondary olefin, may be referred to in view of the above as relatively non-polymerizing.

The reaction vessel may be readily cooled so as to avoid undesirable rise in the temperature of the reaction mass by flowing water through cooling coils placed therein. While specific mention has been made of a temperature of about 30° C., considerable variation therein is permissible bearing in mind that at higher temperatures the reaction will proceed more rapidly but that the tendency to form polymerization products will be increased and that the quantity of catalyst and the time of reaction must be reduced in order to avoid large production of such polymerization products. The maintaining of a lower temperature than 30° C. permits the use of a somewhat higher concentration of catalyst, e. g., sulphuric acid, and in such case the increased amount of catalyst will cause the reaction to proceed at a desirable rate notwithstanding the decreased temperature. Keeping the temperature too low, however, tends to undesirably slow down the ester-forming reaction.

Upon completion of reaction, it is desirable to add a volume of water approximately equal to that of the esterifying acid. The addition of this water and sufficient agitation causes two layers to form, the lower layer comprising the water which contains the catalyst and also the residue of the esterifying acid, the upper layer comprising the tertiary ester which has been formed in the reaction together with normal amylene, pentane and such other substances as were mixed with the iso amylene in the original mixture.

The upper layer is then decanted and again washed with water or with a mild alkali such as sodium carbonate solution, to free it completely from residual traces of acid. It is then fractionated to separate off the normal amylene and pentane, which boil off at about 40° C., leaving tertiary amyl acetate and water as a residue. Since the acid has been removed, the application of heat in distillation will not cause substantial decomposition of the tertiary ester. This may be separated in a settling tank, or by further fractionation.

The process as thus far carried out, therefore, has involved the selective esterification of the iso amylene only, and to a practically molecular degree, leaving unaffected the normal amylene and pentane, and other constituents of the mixture operated upon. It will be noted that iso amylene has been converted into tertiary amyl acetate. While the exact reaction involved is not proven, it may be that the reactions which take place may be represented as follows:

It will be noted that, upon this hypothesis of the reaction, the sulphuric acid, while entering into the reaction at a primary stage, is reformed and rejected at a subsequent stage. The facts that the reaction will only operate in the presence of sulphuric acid, or some other catalyst such as phosphoric acid or zinc chloride, and that the catalyst is fully recovered at the end of the process, tend to support the hypothesis suggested above.

Upon the completion of the foregoing process, a mixture is left in which normal amylene and pentane are present, but from which practically all of the iso amylene has been removed by the process described above. Such a mixture containing normal amylene, may be operated upon by the process of this invention for the conversion of the normal amylene into a secondary ester.

To employ this step of the invention, the normal amylene is completely dissolved in an excess of concentrated catalytic acid, e. g., sulphuric acid of concentration about 77%. Due to the fact that normal amylene is much more stable than iso amylene, this concentration of acid will not cause substantial polymerization of the normal amylene employed in this step but will be sufficient to bring about reaction between normal olefin and esterifying acid. The acid solution is diluted with the esterifying acid, such as acetic acid, and some heat of reaction is at once apparent. The cooling of the reacting mass is not essential due to the stability of the primary amylene being subjected to treatment, though it is regarded as preferable to maintain the temperature of the reaction about 30° C. After three or four minutes, water is added and the mixture is agitated and then allowed to separate in two layers. It is then found that the upper layer comprises secondary amyl acetate and pentane and other hydrocarbons in the original mixture operated upon, and the lower layer comprises the catalytic acid, residual esterifying acid, some of the secondary ester and water.

The upper layer is decanted off and washed or preferably neutralized with sodium carbonate. Since the secondary ester which is formed has a boiling point very much higher than that of the pentane and other hydrocarbon substances mixed with it, these substances may be removed by distillation, care being taken that the still contents shall be maintained neutral during this distillation. After saturated compounds, such as pentane, have been separated off, the still is then operated at a higher temperature to distill off the secondary ester which is collected separately. There remains behind in the still a small residue of polyolefins such as decylene, whose boiling points are much higher than that of the secondary amyl acetate.

While the exact reactions involved in the conversion of normal amylene into secondary amyl ester are not proven, it may be that the reactions which take place may be represented as follows:

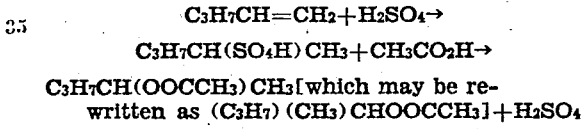

In making secondary ester from normal olefin as above described, phosphoric acid, preferably at a concentration of about 85%, may be used instead of sulphuric acid. Moreover, I have found that normal olefin will react with esterifying acid to form secondary ester in the presence of zinc chloride. Even where only about 5% of zinc chloride is used as above described, some secondary ester can be formed from normal olefin. Upon increasing the amount of zinc chloride, the rate of formation of secondary ester also increases. As the polymerizing effect of zinc chloride upon iso olefin is small, a mixture of both normal and iso olefin may be mixed with esterifying acid and zinc chloride, the latter substance being present in sufficient quantity to produce desirably rapid esterification of both the normal and iso olefin, and thus produce a mixture of secondary and tertiary esters. Where zinc chloride is used in esterification of olefin, the ester produced (either secondary or tertiary or both) appears in an upper layer which may also comprise a small amount of esterifying acid. The zinc chloride and the bulk of the esterifying acid will separate out in a lower layer. The upper layer may be decanted for recovery of ester as already described.

As a specific example, 106 cc. of amylene produced by the hydrolyzing operation above described in connection with the production of amyl alcohol was mixed with 57 cc. of glacial acetic acid, forming a clear solution with no production of heat. To this 5% of concentrated sulphuric acid (98%) was added and the mixture was agitated for about three minutes. During the agitation some heat was produced but the temperature was kept below 30° C. About 60 cc. of water was then added and the mixture was further agitated and allowed to separate into layers. After settling, the upper layer was decanted off and washed with sodium carbonate solution. After washing, normal amylene and pentane were boiled off at about 40° C., leaving behind tertiary amyl acetate having a boiling point of about 124.8° C.

The mixture of normal amylenes and pentanes was then dissolved completely in 77% sulphuric acid. When completely dissolved, the solution was then diluted with glacial acetic acid. There was some evolution of heat. On completion of the reaction, a portion of the ester formed was found to be floating in a separate layer on the surface of the acid layer. Dilution of the acid with water was found to liberate a further quantity of ester, and distillation served to drive off the ester and the acetic acid. After gravity separation of this distillate, the ester was decanted and a pure product obtained by fractionation.

Alternatively in making secondary ester from normal amylene which may or may not be mixed with pentane, it is expedient in adding acetic acid to a solution of the normal amylene in sulphuric acid of about 77% concentration to add a substantial excess thereof. In such case, at the end of the reaction there will be formed an upper layer comprising secondary amyl acetate and any pentane that is present and the excess acetic acid will be found in a lower layer comprising acetic acid, a small amount of secondary amyl acetate and sulphuric acid, the concentration of the latter acid being not over about 60%. Upon drawing off the upper layer for the recovery of secondary ester, the acetic acid and sulphuric acid in the lower layer remaining in the reaction vessel may be utilized in making tertiary ester merely by mixing therewith iso amylene or a mixture of normal and iso amylenes. As the concentration of sulphuric acid in this case is about 60%, care should be taken that the temperature of the reaction is maintained at or below about 30° C. and that the time during which the reaction mass comprising iso olefin is maintained in contact with the sulphuric acid be reduced as much as possible in order to prevent the formation of excessive amounts of polymerization products. Under these conditions, only the iso amylene will react and only tertiary amyl acetate will be formed. The reacting materials may then be diluted with water, and one may find it expedient to employ waste wash water which has been used in washing the pentane-ester layer occurring in the formation of secondary ester from normal olefin and which may contain some sulphuric and acetic acids. Since there is considerable heat liberated upon this dilution, it is necessary to cool the mass. After the dilution, tertiary amyl acetate that has been formed, secondary amyl acetate, normal amylene which has not taken part in the reaction, and a very small quantity of acetic and sulphuric acids separate out as an upper layer which may be removed, and, if desired, washed with water and also, if necessary, steam distilled to remove in the steam distillate substantially all traces of acid which would otherwise cause polymerization of tertiary ester during dry distillation. The normal amylene that may be present may be removed by simple distillation and will pass over first in the distillate. This normal amylene may be further treated as already described in the making of secondary ester from normal olefin by dissolving it in 77% sulphuric acid, adding esterifying acid thereto, etc. The mixture of secondary and tertiary amyl acetate thus produced can be separated by fractionation if it is desired to do so.

Moreover, instead of drawing off the upper layer of pentane and secondary amyl acetate in the process just described after the normal olefin has been esterified utilizing an excess of organic acid, this layer may be left in the reaction mass and iso olefin or a mixture of normal and iso olefins may be directly introduced into the mass as the sulphuric acid will have been diluted with the excess of organic acid and other substances in the mass to such an extent that excessive polymerization of iso olefin will not occur. In such case, after dilution with water, an upper layer will be formed comprising the tertiary ester, the secondary ester, normal amylene, pentane and a very small quantity of acetic and sulphuric acids. This layer can be treated as above described for the recovery of tertiary and secondary esters or a mixture thereof.

I have found that the process of my invention is adaptable to the formation of tertiary esters from any iso olefin. Inasmuch as iso olefins are only possible, when consideration is given to the structure of the molecule, in olefins having four or more carbon atoms, it will be understood that my invention is applicable to the formation of tertiary esters from iso butylene and the higher homologues of iso butylene. It has been described herein in connection with the esterification of iso amylenes, but it is equally applicable to the esterification of iso hexylene, iso heptylene, iso octylene, and so on through the homologues of the olefin series.

The invention has been particularly described in connection with the formation of the acetic acid ester. The invention, however, is not limited to the formation of the acetate, but contemplates the use of any organic acid which is soluble to substantial extent in the reaction mixture.

This invention is applicable with those acids having a hydroxyl radical in addition to a carboxyl radical. In such case, the carboxyl radical will enter into the formation of ester. The hydroxyl radical may also react with the formation of an ether producing a mixed function compound, i. e., ester and ether. For example, when lactic acid, which contains both a carboxyl radical and a hydroxyl radical, is subject to the process of making tertiary ester above described using iso amylene, a mixed product is formed, namely, the tertiary amyl ether of tertiary amyl lactate.

While the exact reaction is not proven, it may be that the reaction in such case takes place as follows:

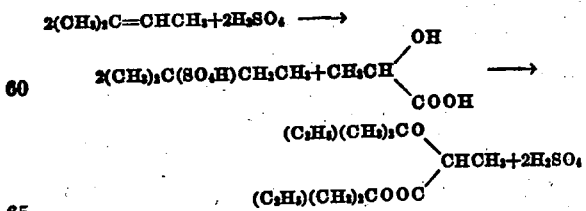

Similarly, the secondary amyl ether of secondary amyl lactate may be made from primary amylene as hereinabove described in connection with the manufacture of secondary ester and mixed normal and iso olefin may be treated.

Thus not only will substances which have a carboxyl radical react with normal and iso olefins to produce secondary and tertiary esters as above described but substances having a hydroxyl radical will react with normal and iso olefins to produce secondary and tertiary ethers and this invention as above described is adaptable to the formation of ethers from such substances.

In the practise of this invention, it is advisable to avoid direct treatment of the mixed normal and iso olefins with concentrated sulphuric acid and it is pointed out that iso olefins are particularly susceptible of polymerizing to form products of greater carbon atom content, whereas normal olefins are comparatively stable. Accordingly, it is possible to use sulphuric acid, or the like, in concentrated form only after iso olefin has been esterified and after the esterified product has been removed.

It is also pointed out that olefins directly produced in the pyrogenetic cracking of gasoline hydrocarbons cannot advantageously be employed in the practise of this invention, since such olefins ordinarily consist of a mixture of olefins having differing carbon atom content and therefore consist of a mixture of materials each of which would require somewhat different acid concentration for most advantageous treatment, and in particular since iso olefins are unstable in the pyrogenetic cracking process.

I claim:—

1. A method for the production of tertiary esters comprising reacting at substantially atmospheric pressure an iso olefin with an aliphatic mono-carboxylic acid containing the acyl radical of the desired ester in the presence of a relatively non-polymerizing quantity of sulphuric acid.

2. A method for the production of tertiary esters comprising reacting an iso olefin with an aliphatic mono-carboxylic acid containing the acyl radical of the desired ester in the presence of a reagent containing less than about 60% by weight of sulphuric acid and at a temperature below about 30° C.

3. A method for separating normal olefin from iso olefin mixed therewith which comprises reacting a mixture of said olefins with a mono-basic aliphatic carboxylic acid in the presence of a relatively non-polymerizing quantity of a catalytic acid, permitting the reaction to proceed, and separating esterified iso olefin from unesterified normal olefin.

4. A method for separating normal amylene from iso amylene mixed therewith which comprises reacting a mixture of said amylenes with a mono-basic aliphatic carboxylic acid in the presence of a relatively non-polymerizing quantity of a catalytic acid, permitting the reaction to proceed, and separating unesterified normal amylene from the mixture so formed.

5. A method of producing secondary and tertiary esters from a mixture of normal and iso olefins having the same carbon atom content, which comprises reacting said mixture with an aliphatic mono-carboxylic acid containing the acyl radical of the desired ester and with a limited quantity of sulphuric acid at a temperature sufficiently low to avoid excessive polymerization of iso olefin, separating off tertiary ester, dissolving the remaining normal olefin in sulphuric acid and diluting this solution with an aliphatic mono-carboxylic acid containing the acyl radical of the desired ester to form secondary ester.

6. A method of producing secondary and tertiary amyl esters from a mixture of normal and iso amylenes which comprises reacting said mixture with an aliphatic mono-carboxylic acid containing the acyl radical of the desired ester and with a limited amount of sulphuric acid at a temperature sufficiently low to avoid excessive polymerization of iso amylene, separating off tertiary amyl ester, dissolving the remaining normal amylene in sulphuric acid and diluting this solution with an aliphatic mono-carboxylic acid containing the acyl radical of the desired ester to form secondary amyl ester.

7. A method of producing secondary and tertiary esters from a mixture of normal and iso olefins having the same carbon atom content, which comprises reacting said mixture with an aliphatic carboxylic acid in the presence of a catalyst while maintaining the temperature of the reaction and the concentration of the catalyst sufficiently low to prevent undesirably rapid polymerization of iso olefin, separating off tertiary ester, dissolving the remaining normal olefin in sulphuric acid, diluting this solution with an aliphatic mono-carboxylic acid to form secondary ester, and then adding water.

8. A method for producing tertiary esters which comprises reacting the olefin fraction resulting from the dehydrohalogenation of hydrocarbon halides having four or more carbon atoms, with an aliphatic mono-carboxylic acid having the acid radical of the desired ester and with a limited quantity of sulphuric acid, and separating the tertiary ester thus formed from any unesterified normal olefin and from any saturated hydrocarbon present.

9. A method of producing tertiary esters which comprises reacting the olefin fraction resulting from the dehydrohalogenation of hydrocarbon halides having four or more carbon atoms, with an aliphatic mono-carboxylic acid having the acid radical of the desired ester in the presence of a catalyst while maintaining the temperature of the reaction and the quantity of the catalyst sufficiently low to prevent undesirably rapid polymerization of iso olefin, and separating the tertiary ester thus formed from any unesterified normal olefin and from any saturated hydrocarbons present.

10. A method for producing tertiary esters which comprises reacting iso olefin with an aliphatic mono-carboxylic acid having the acid radical of the desired ester in the presence of a catalyst while maintaining the temperature of the reaction and the quantity of the catalyst sufficiently low to prevent undesirably rapid polymerization of iso olefin, adding water thereto, permitting layers to form, separating the upper layer from the lower layer, distilling off any normal olefin and any saturated hydrocarbon present from the separated upper layer and thereby producing a residue comprising tertiary ester.

11. A method for the production of secondary and tertiary esters which comprises reacting normal olefin with relatively concentrated sulphuric acid and with an amount of mono-basic aliphatic carboxylic acid in excess of the theoretical amount required for esterifying said normal olefin, the amount of sulphuric acid being such that after reaction the proportion of sulphuric acid will be sufficiently low to avoid undesirably rapid polymerization of iso olefin added to the mass, permitting the reaction to proceed and then mixing iso olefin with remaining excess aliphatic mono-carboxylic acid and sulphuric acid.

12. A method for the production of secondary and tertiary esters which comprises reacting normal amylene with relatively concentrated sulphuric acid and with an amount of aliphatic carboxylic acid in excess of the theoretical amount required for esterification of said normal amylene, the amount of sulphuric acid used being such that after reaction the proportion of sulphuric acid will be sufficiently low to avoid undesirably rapid polymerization of iso amylene added to the mass, permitting the reaction to proceed, mixing a mixture of normal and iso amylenes with remaining sulphuric acid and excess aliphatic mono-carboxylic acid, and separating off primary and secondary esters thus produced.

13. A method of producing secondary and tertiary esters from a mixture of normal and iso olefins having the same carbon atom content, which comprises reacting said mixture with an aliphatic mono-carboxylic organic acid containing acyl radical of the desired ester and with a limited quantity of sulphuric acid, separating off tertiary ester, dissolving unesterified normal olefin in sulphuric acid and diluting the solution with a quantity of an aliphatic mono-carboxylic organic acid containing the acyl radical of the desired ester in excess of that theoretically required to esterify said normal olefin, separating off secondary ester from said sulphuric acid and said organic acid, mixing a mixture of normal and iso olefins with said remaining sulphuric acid and excess organic acid while maintaining the temperature of the reaction and the concentration of the sulphuric acid sufficiently low to avoid undesirably rapid polymerization of iso olefin, and separating off tertiary ester.

14. A method of producing secondary and tertiary esters which comprises dissolving normal olefin in sulphuric acid and diluting the solution with a quantity of mono-basic aliphatic carboxylic acid in excess of that theoretically required for esterification of said normal olefin, separating off secondary ester from said sulphuric acid and said excess organic acid, reacting a mixture of normal and iso olefins with said remaining sulphuric acid and excess aliphatic mono-carboxylic acid while maintaining the temperature of the reaction and the concentration of the sulphuric acid sufficiently low to avoid undesirably rapid polymerization of iso olefin, and separating off tertiary ester.

15. A method for producing secondary and tertiary esters which comprises reacting normal olefin with relatively concentrated catalyst and with a quantity of an aliphatic mono-carboxylic acid containing the acyl radical of the desired ester in excess of that theoretically required to esterify said normal olefin, separating the secondary ester thus formed from said excess organic acid and catalyst, reacting a mixture of normal and iso olefins with said remaining catalyst and excess aliphatic mono-carboxylic acid, and separating off tertiary ester thus formed.

16. A method for the production of tertiary esters comprising reacting at substantially atmospheric pressure an iso olefin with an aliphatic mono-carboxylic acid containing the acyl radical of the desired ester and with the anhydride of said acid in the presence of a catalyst present in an amount insufficient to cause undesirable side reaction to a substantial extent.

17. A method for the production of tertiary amyl esters comprising reacting iso amylene with an aliphatic mono-carboxylic acid containing the acyl radical of the desired ester and the anhydride of said acid in the presence of a catalyst at a temperature insufficient to cause substantial polymerization of the amylene.

18. A method for the production of tertiary amyl acetate comprising reacting iso amylene with acetic acid in the presence of sulphuric acid catalyst and acetic anhydride while maintaining the temperature of the reaction and the concentration of the sulphuric acid sufficiently low to prevent undesirably rapid polymerization of iso amylene.

19. A method for the production of secondary and tertiary esters comprising reacting at substantially atmospheric pressure a mixture of normal and iso olefins with an aliphatic mono-carboxylic acid containing the acyl radical of the desired ester and zinc chloride present in an amount insufficient to cause polymerization of the olefins.

20. A method for the production of a tertiary ether of a tertiary ester comprising reacting an iso olefin with an aliphatic acid containing both a mono-carboxyl and an hydroxyl radical in the presence of a catalyst.

21. A method for the production of a tertiary ether of a tertiary ester comprising reacting iso olefin with an alipatic acid containing both a mono-carboxyl and an hydroxyl radical in the presence of a heavy acid catalyst while maintaining the temperature of the reaction and the concentration of the catalyst sufficiently low to prevent undesirably rapid polymerization of iso olefin.

22. A method for the production of a secondary ether of a secondary ester comprising reacting normal olefin with an aliphatic acid containing both a mono-carboxyl and an hydroxyl radical and a heavy acid selected from the group consisting of sulphuric acid and phosphoric acid.

23. A method for the production of a secondary ether of a secondary ester comprising reacting normal olefin with an aliphatic acid containing both a mono-carboxyl and an hydroxyl radical and a catalyst.

24. A method comprising reacting normal and iso olefins with an aliphatic acid containing both a mono-carboxyl and an hydroxyl radical in the presence of a catalyst.

25. A method for the production of tertiary esters that comprises reacting an iso-olefin with an aliphatic carboxylic acid in the presence of a catalyst while maintaining the temperature of the reaction at a point not greater than around 30° C. to prevent substantial polymerization of the iso-olefin.

26. A method for the production of tertiary amyl esters comprising reacting iso-amylene with an aliphatic mono-carboxylic acid containing the acyl radical of the desired ester in the presence of a relatively non-polymerizing quantity of sulphuric acid not exceeding 60% in concentration.

WILLIAM McCANDLISS LEE.